(12) United States Patent
Devine (10) Patent No.: US 12,480,541 B1
(45) Date of Patent: Nov. 25, 2025

(54) MANUALLY OPERATED SNAP HOOK

(71) Applicant: Christopher Devine, Simi Valley, CA (US)

(72) Inventor: Christopher Devine, Simi Valley, CA (US)

( * ) Notice: Subject to any disclaimer, the term of this patent is extended or adjusted under 35 U.S.C. 154(b) by 0 days.

(21) Appl. No.: 18/805,942

(22) Filed: Aug. 15, 2024

Related U.S. Application Data

(60) Provisional application No. 63/668,116, filed on Jul. 5, 2024, provisional application No. 63/572,267, filed on Mar. 30, 2024.

(51) Int. Cl.
*F16B 45/04* (2006.01)

(52) U.S. Cl.
CPC .......... *F16B 45/049* (2021.05); *F16B 45/057* (2021.05)

(58) Field of Classification Search
CPC .... F16B 45/049; F16B 45/057; F16B 45/053; F16B 45/051; F16B 45/055; F16B 45/043; F16B 45/04; Y10T 24/4005; Y10T 24/3491
See application file for complete search history.

(56) References Cited

U.S. PATENT DOCUMENTS

| | | | | | |
|---|---|---|---|---|---|
| 252,015 | A * | 1/1882 | Bragg | ................... | F16B 45/049 24/600.7 |
| 319,958 | A * | 6/1885 | Covert | ................. | F16B 45/049 137/434 |
| 461,647 | A * | 10/1891 | Smith | ................... | F16B 45/049 24/600.7 |
| 473,315 | A * | 4/1892 | Howe | ................... | F16B 45/049 24/165 |
| 680,800 | A * | 8/1901 | Munchmeyer | ........ | F16B 45/049 24/600.7 |
| 961,686 | A * | 6/1910 | Covert | .................. | F16B 45/049 24/600.7 |
| 4,372,016 | A * | 2/1983 | LaViolette | ............ | F16B 45/053 24/600.7 |
| 4,689,860 | A * | 9/1987 | Suchowski | ............. | F16B 45/04 24/600.7 |
| 5,915,631 | A * | 6/1999 | Laxton | ................... | F16B 45/053 24/302 |
| 7,526,843 | B2 * | 5/2009 | Lin | ....................... | F16B 45/053 24/600.2 |

(Continued)

*Primary Examiner* — Jason W San
*Assistant Examiner* — Louis A Mercado
(74) *Attorney, Agent, or Firm* — Sandy Lipkin (57) ABSTRACT

A manually operated snap hook that includes a main body outer cylinder with an internal hook assembly and slide bolt assembly housed and sandwiched therein. The main body outer cylinder has a recessed portion that corresponds to recessed portions on the internal hook assembly and slide bolt assembly that has therein an actuator that is connected to a vertical spring, such that when the actuator is depressed, the slide bolt assembly allows for a bolt to move in the vertical direction along the main body outer cylinder such that it can both connect to and disconnect from the hook of the internal hook assembly, which emanates from the main body outer cylinder through a cut out. The internal hook assembly includes a male connecting member that extends beyond the bottom of the main body outer cylinder and connects to a female portion of a swivel ring assembly.

3 Claims, 14 Drawing Sheets

(56) References Cited

U.S. PATENT DOCUMENTS

| | | | | |
|---|---|---|---|---|
| 8,365,365 B2* | 2/2013 | Schlipper | ............... | F16B 45/049 24/265 H |
| 2005/0138781 A1* | 6/2005 | Chen | ..................... | F16B 45/049 24/600.8 |
| 2007/0261210 A1* | 11/2007 | Chen | ..................... | F16B 45/049 24/265 H |

* cited by examiner

MANUALLY OPERATED SNAP HOOK

BACKGROUND OF THE INVENTION

Reference to Prior Application

This application claims priority of the provisional patent application 63/572,267, filed Mar. 30, 2024 entitled DEVICE, METHOD, AND ALTERNATE DESIGN OF A MANUALLY-OPERATED SNAP HOOK by Christopher Device and provisional patent application 63/668,116, filed Jul. 5, 2024 entitled DEVICE, METHOD, AND ALTERNATE DESIGN OF A MANUALLY-OPERATED SNAP HOOK by Christopher Devine.

FIELD OF THE INVENTION

The field of this invention relates generally to the field of snap hooks and more particularly toward an improved snap hook that is manually operated snap hook for use in dog leashes, keychains, handbags and queue lines.

DESCRIPTION OF THE PRIOR ART

Snap hooks are utilized to connect one item to another, i.e., to connect a dog leash to a collar, to connect other elongated items, such as key chains or hand bags and to connect lines in queues. Typically, snap hooks utilize a protruding actuating member that is pressed down to create an opening in a closed loop, after which, the now broken loop has a hook that can be attached to a desired object, after which the protruding actuating member is then released, thereby re-closing the closed loop.

One disadvantage of this design is that the pressure required to press down on the protruding actuating member can sometimes be difficult to attain depending upon the size of the snap hook and/or the strength of the hands and fingers of the person utilizing it.

It is the primary object of the instant invention to provide for a simplified design for a manually operated snap hook that is far easier to activate that existing snap hooks on the market.

SUMMARY OF THE INVENTION

The basic embodiment of the present invention teaches a manually operated snap hook comprising: a main body outer cylinder, said main body outer cylinder further comprising: an open top; an open bottom; an outer surface; a recessed cutout along said outer surface; and a cut out proximate said open top; an internal hook assembly situated inside of said main body outer cylinder, said internal hook assembly further comprising: a main elongated portion having a top and a bottom; a hook attached to said top; a first flange extending perpendicularly outward from said top; a second flange extending perpendicularly outward from said bottom; an aperture in said first flange; a recessed portion along said main elongated portion between said first and second flanges; and an extending member extending vertically down from said bottom of said main elongated portion; a slide bolt assembly situated in said recessed portion along said main elongated portion of said internal hook assembly, said slide bolt assembly further comprising: a flat face to rest in said recessed portion along said main elongated portion of said internal hook assembly; a concave surface opposite said flat face, said concave surface having a recessed portion positioned to match said recessed cutout along said surface of said main body outer cylinder, said concave surface having and a top and bottom; and a bolt attached to said top of said concave surface, said bolt to extend through said first aperture in said first flange in said internal hook assembly in order emanate through said top of said main body outer cylinder and to connect to and disconnect from said hook of said internal hook assembly; a spring situated below said bottom of said concave surface of said slide bolt assembly in said internal hook assembly; and an actuator situated inside of said recessed cutout of said main body outer cylinder that when depressed activates said spring to move said bolt vertically downward from said hook from an closed position to an open position.

The above embodiment can be further modified by defining that said manually operated snap hook further comprises a swivel ring assembly attachable to said extending member of said bottom of said main elongated portion of said internal hook assembly, said swivel ring assembly further comprising: a main base having a first end and a second end; an aperture in said main base to connect said extending member from said bottom of said main elongated portion of said internal hook assembly; and a closed loop that connects to both said first and second ends of said main base.

The above embodiment can be further modified by defining that a protruding external actuator is connected to said slide bolt assembly above said actuator, said protruding external actuator further comprising: a top base in a first plane; a bottom base in a second plane, said second plane extending out beyond said first plane; a sloping front face extending from said top base and said bottom base thereby creating a concave surface that is depressable to activate said actuator; and a rear face.

BRIEF DESCRIPTION OF THE DRAWINGS

For a better understanding of the present reference is to be made to the accompanying invention, drawings. It is to be understood that the present invention is not limited to the precise arrangement shown in the drawings.

DETAILED DESCRIPTION OF A PREFERRED EMBODIMENT

Turning to the drawings, the preferred embodiment is illustrated and described by reference characters that denote similar elements throughout the several views of the instant invention.

The preferred embodiment of the instant invention provides for a manually operated snap hook that eliminates the protrude actuating member of prior art snap hooks and replaces it with an indented concave area for actuation of the device to either open or close the closed loop of the snap hook.

The device provides for a safe and more user-friendly way to engage the slide bolt, making the device ideal for easy and comfortable engagement with the user's fingers. The device utilizes a wide, concave shape on the slide bolt to reduce the pressure point exerted on the extremity of the user's finger tips. The spring load in pounds per square inch ("PSI") is distributed over a wider area from prior art devices, thereby making usage easier and more comfortable.

The device incorporates a cylinder-shaped body which is suitable for easy handling, durable by design and ideal for electronic engraving of a company logo, company name, or any other customizable image or word, such as an image or a name.

The device primarily benefits those who may have difficulty with actuating common snap hooks. The concave slide bolt shape provides ease of use and improved comfort whether the user uses an index finger or a thumb. The cylindrical body is easy handle, durable and engravable as well providing an aluminum surface which can be anodized in a variety of colors or otherwise printed on all metallic materials per the desire of the user and/or manufacturer.

It is contemplated that the materials used include, but are not limited to, aluminum, nickel, gunmetal, brass, zinc, plastic or composites. The size is scalable to however larger or small is desired.

As seen in FIGS. 1-20 we see the various aspects of the preferred embodiment of the instant invention, which is a manually-operated snap hook 10 that includes a main body outer cylinder 12 with an internal hook assembly 28 housed therein along with a slide bolt assembly 44. Seen from the outside is the hook 14 that emerges out of the top of the main body outer cylinder 12 which has a cut out 26 to allow for the hook 14 to emerge therefrom. The hook 14 is connected to a bolt 16 which is a part of the larger internal slide bolt assembly 44 also housed inside of the main body outer cylinder 12.

The main body outer cylinder 14 has a recessed portion 22 in alignment with the bolt 16 that includes an actuator 24 therein for depression of the snap hook 10 that allows the bolt 16 and the hook 14 to separate from each other. Beneath the actuator 24 in the same vertical direction is a spring 20 that allows for the movement of the bolt 16 when actuated. At the opposite end of the main body outer cylinder 12 from the hook 14 and bolt 16 is a swivel ring assembly 18. The swivel ring assembly 18 can be attached to a desired item or point while the actuator 24 can open and close the hook 14 by separating it from the bolt 16 through depression of the actuator 24 inside of the recessed space 22 of the main body outer cylinder 12.

Figure 1:
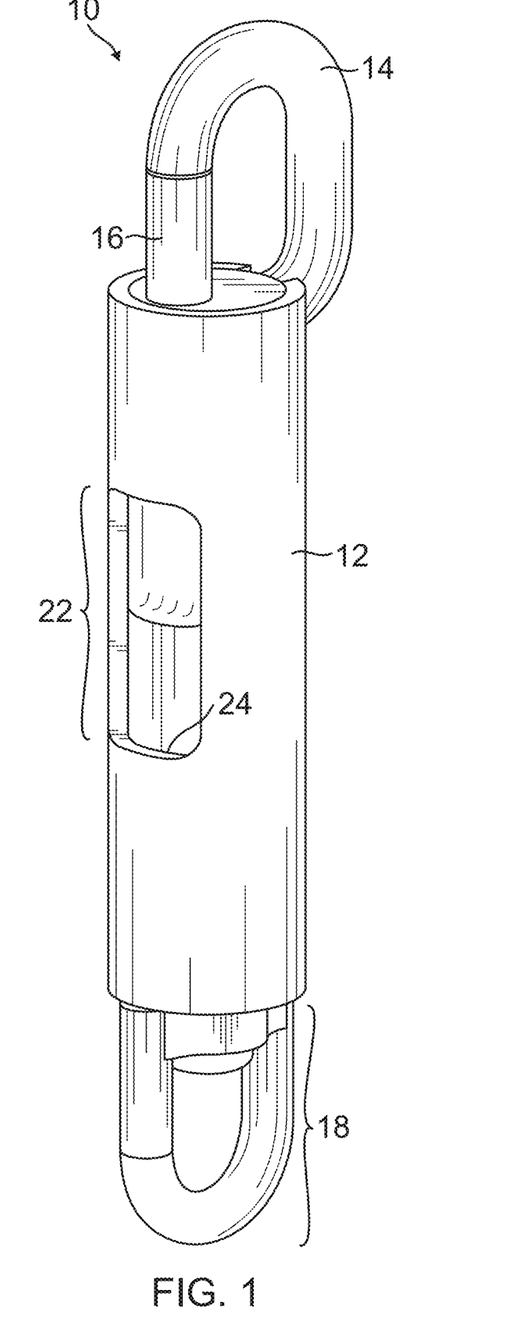
FIG. 1 is a front perspective view of the manually operated snap hook of the instant invention.
Figure 2:
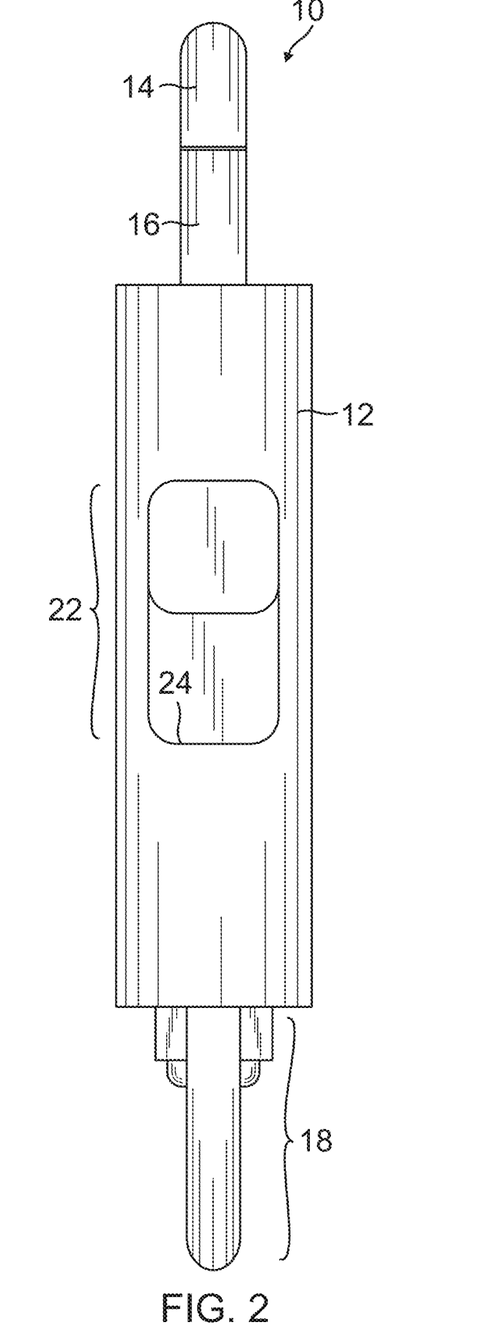
FIG. 2 is a front view of the manually operated snap hook of the instant invention.
Figure 3:
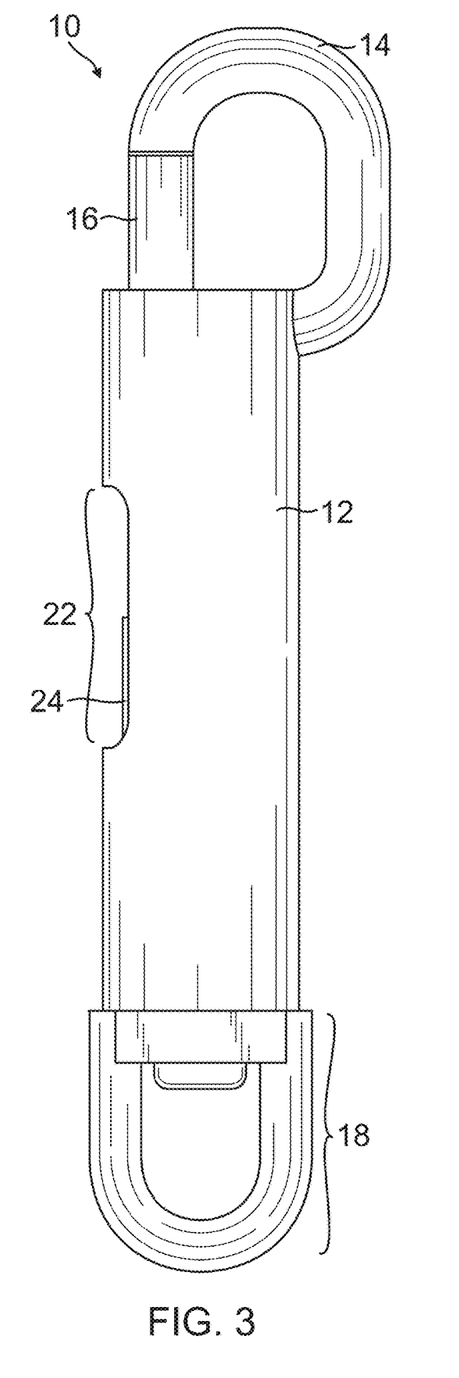
FIG. 3 is a side view of the manually operated snap hook of the instant invention.
Figure 4:
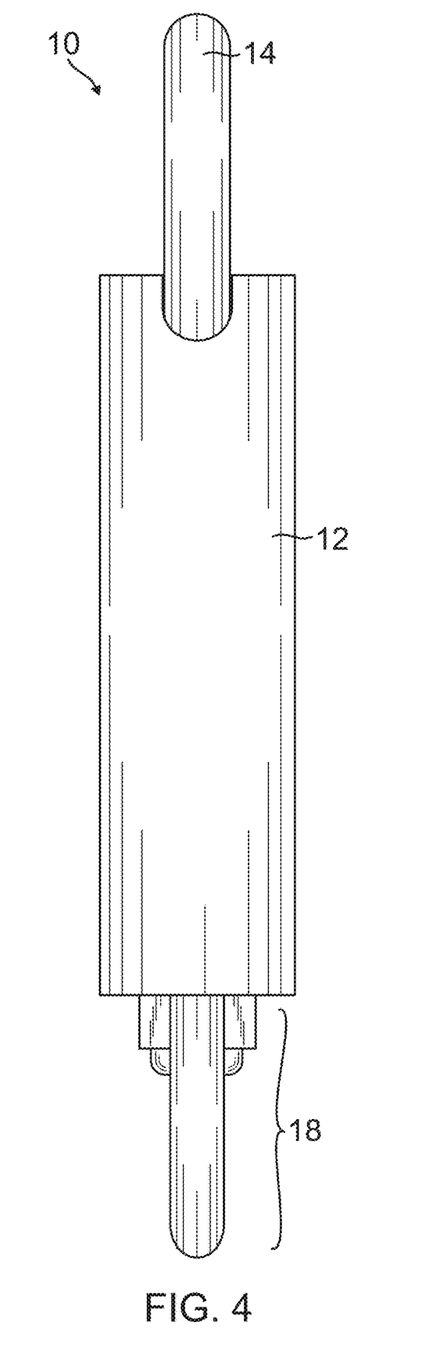
FIG. 4 is a rear view of the manually operated snap hook of the instant invention.
Figure 5:
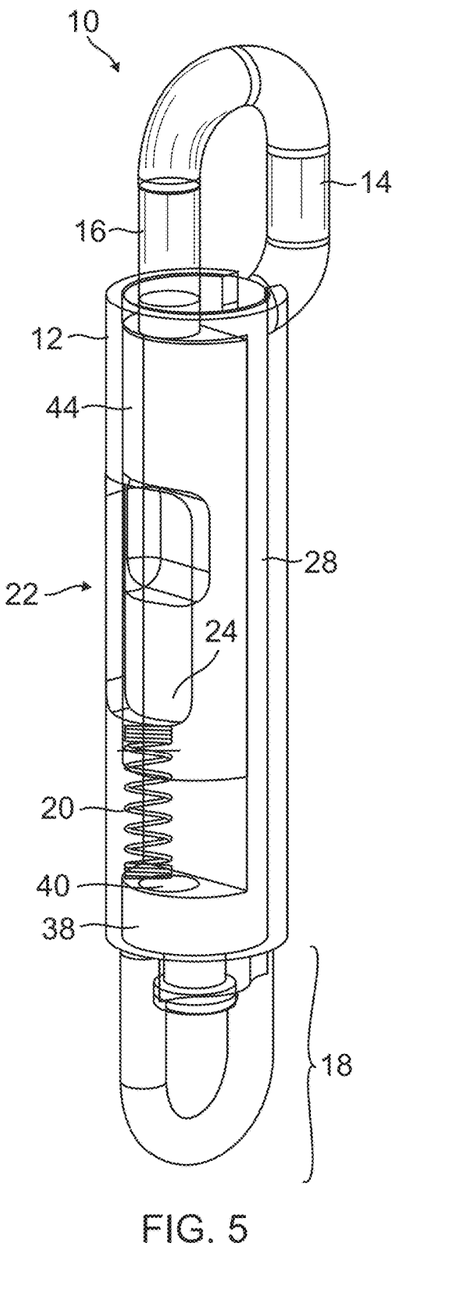
FIG. 5 is a front perspective view of the wire frame seen inside of the manually operated snap hook of the instant invention.
Figure 6:
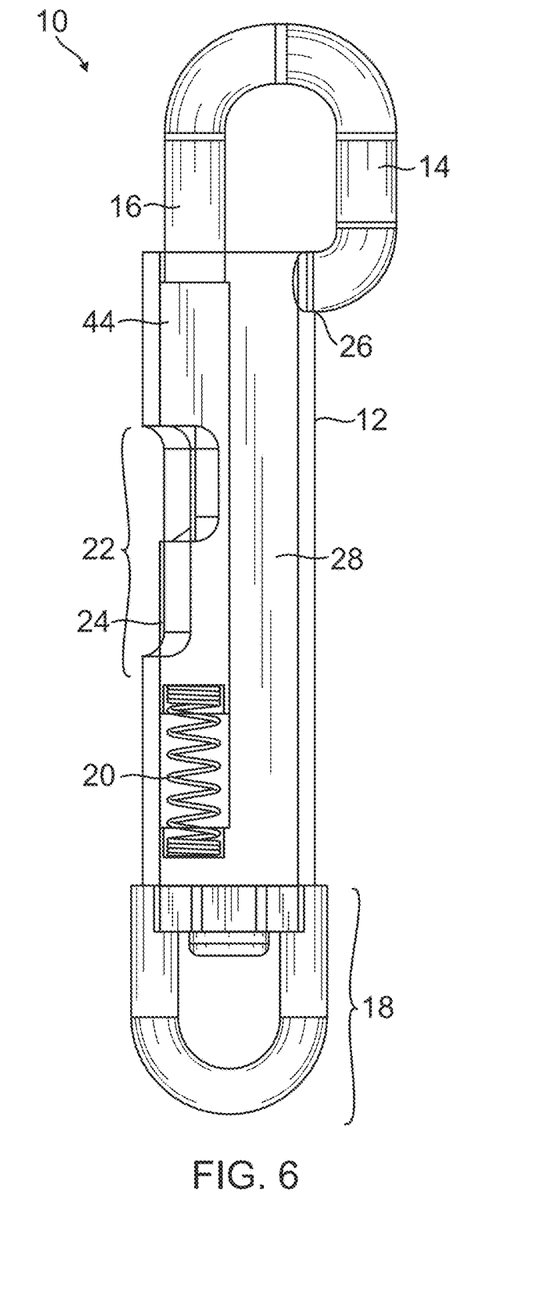
FIG. 6 is a front view of the wire frame seen inside of the manually operated snap hook of the instant invention.
Figure 7:
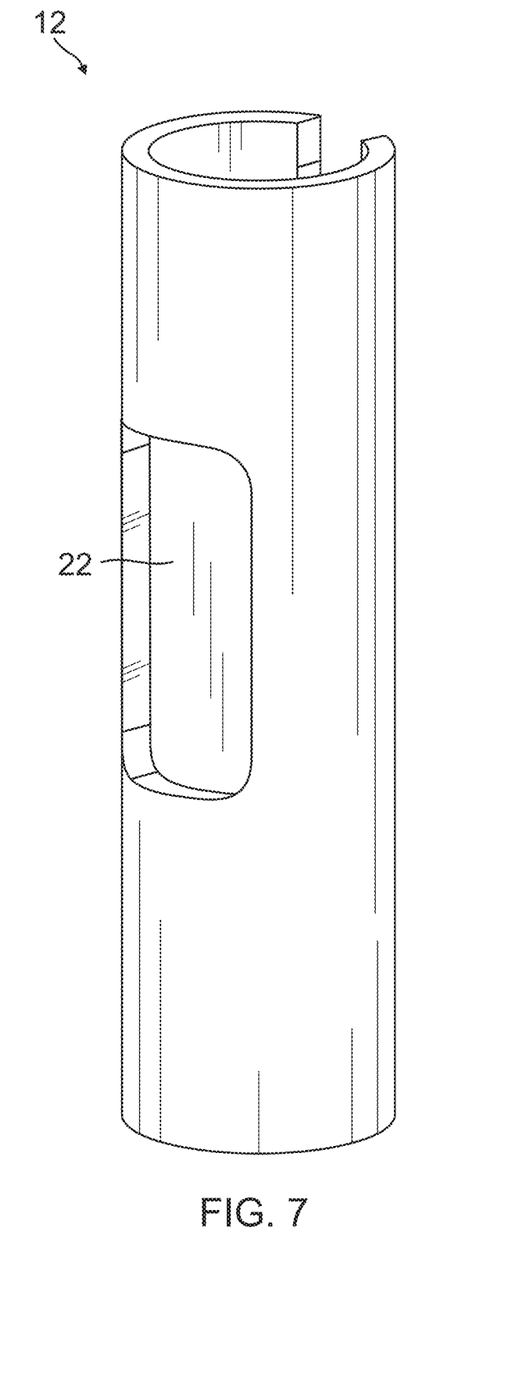
FIG. 7 is a front perspective view of the cylinder portion of the manually operated snap hook of the instant invention.
Figure 8:
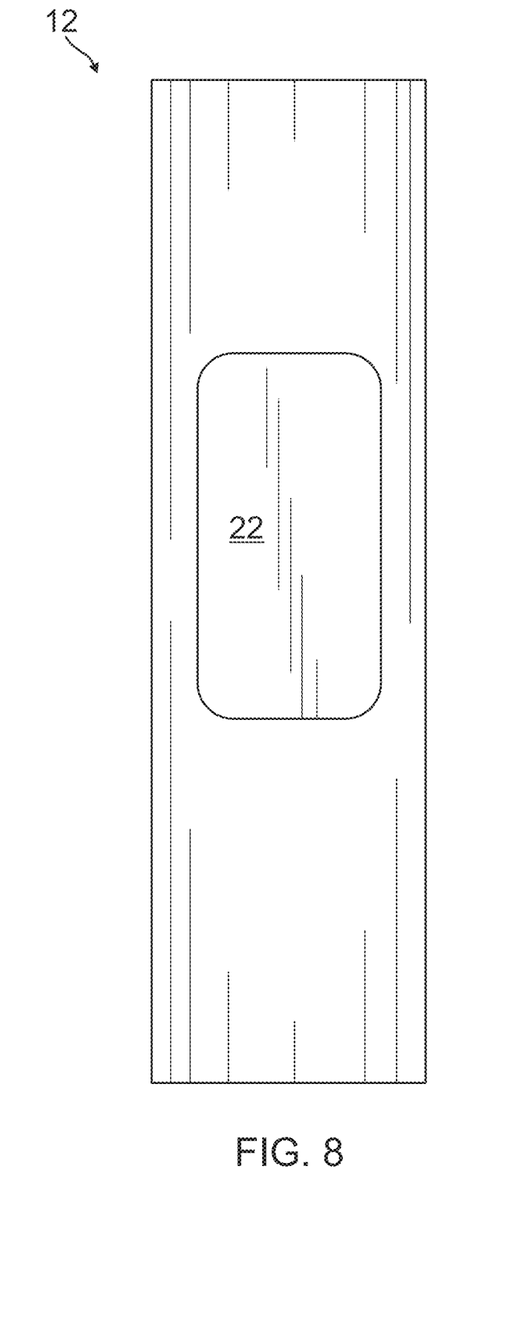
FIG. 8 is a front view of the cylinder portion of the manually operated snap hook of the instant invention.
Figure 9:
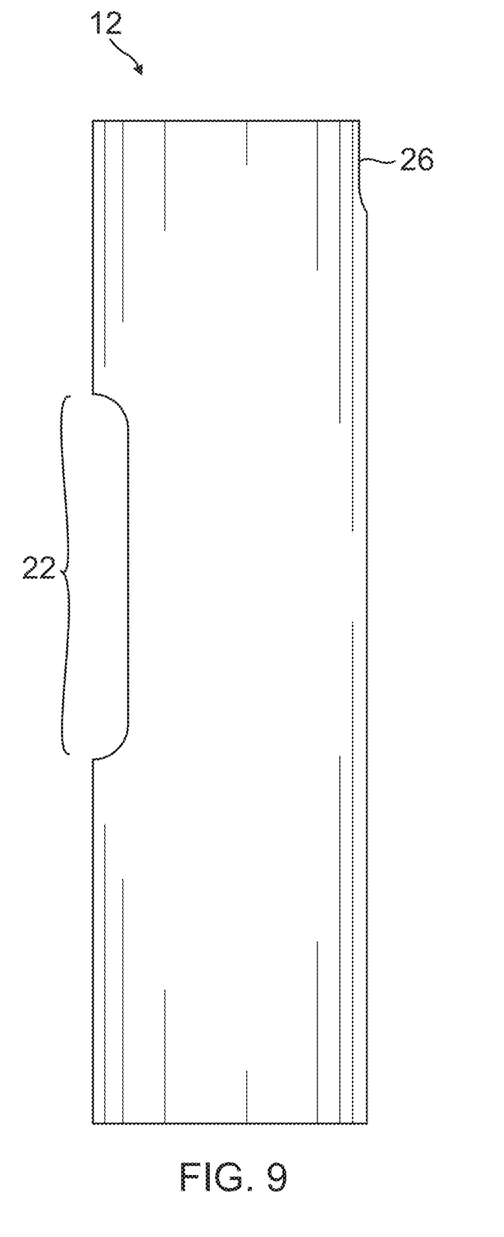
FIG. 9 is a side view of the cylinder portion of the manually operated snap hook of the instant invention.
Figure 10:
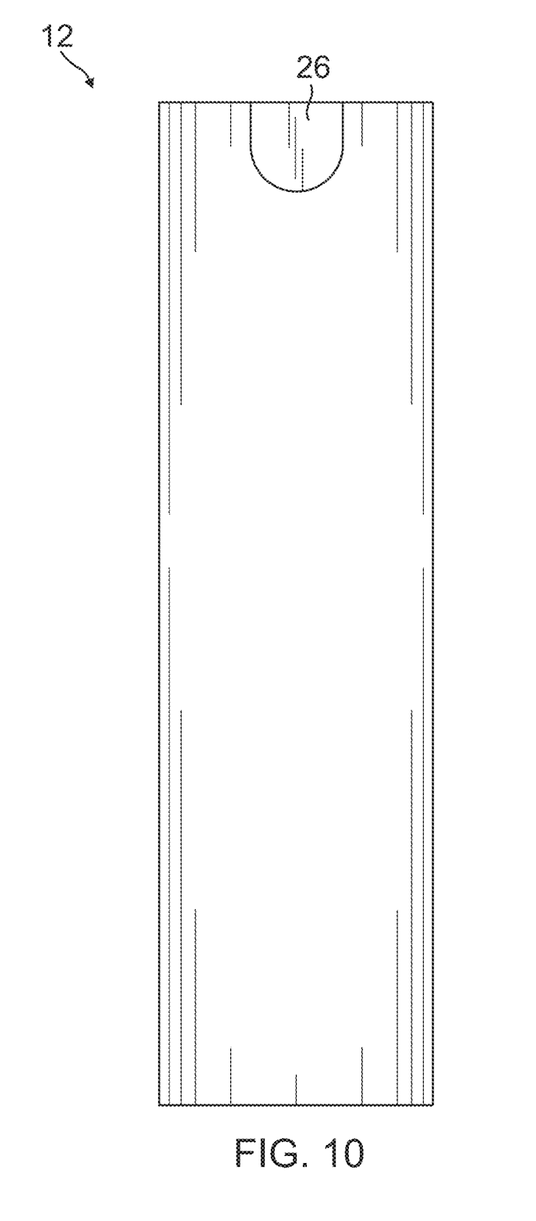
FIG. 10 is a rear view of the cylinder portion of the manually operated snap hook of the instant invention.
Figure 11:
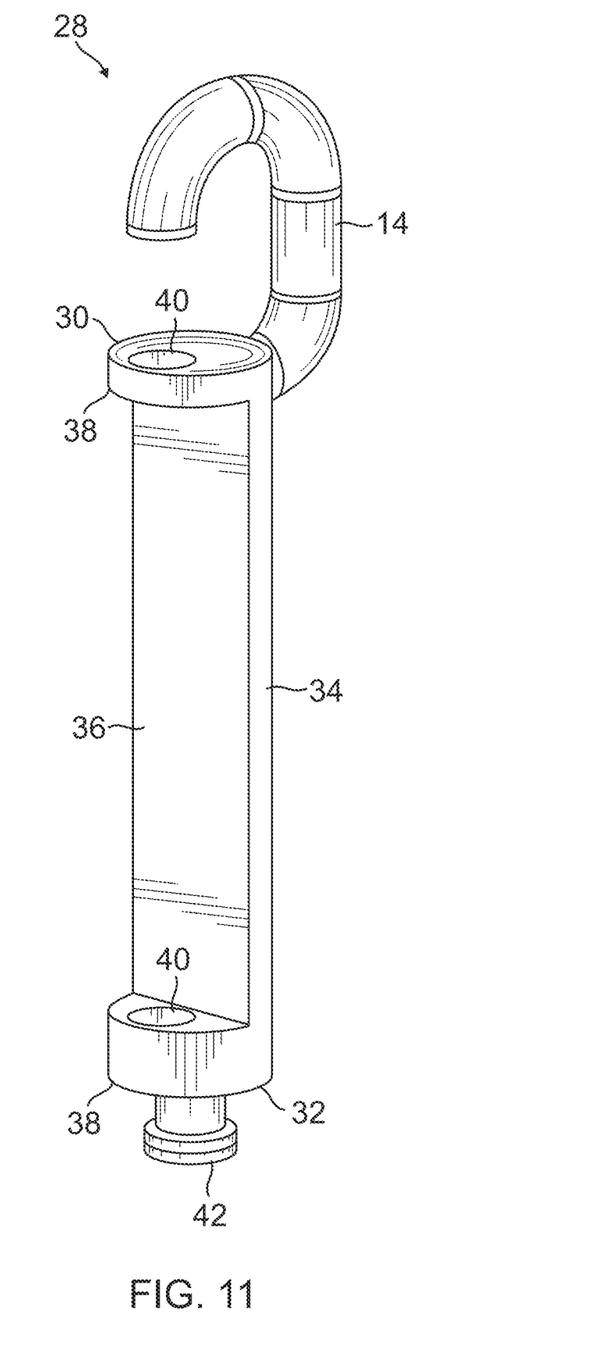
FIG. 11 is a front perspective view of the internal hook assembly of the manually operated snap hook of the instant invention.
Figure 12:
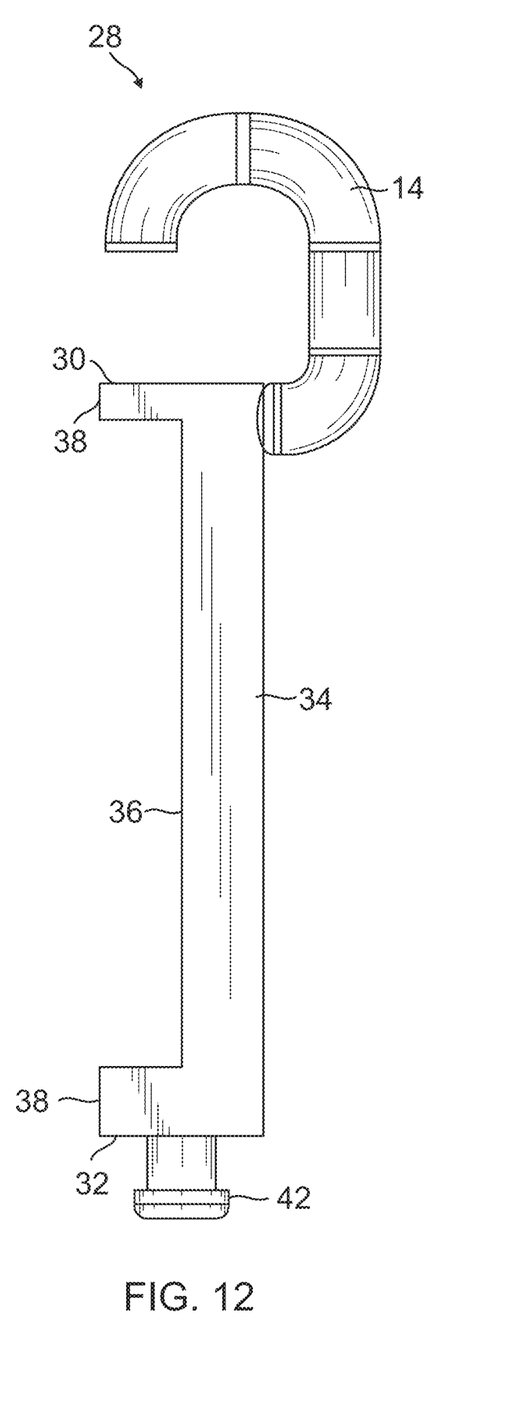
FIG. 12 is a side view of the hook portion of the manually operated snap hook of the instant invention.
Figure 13:
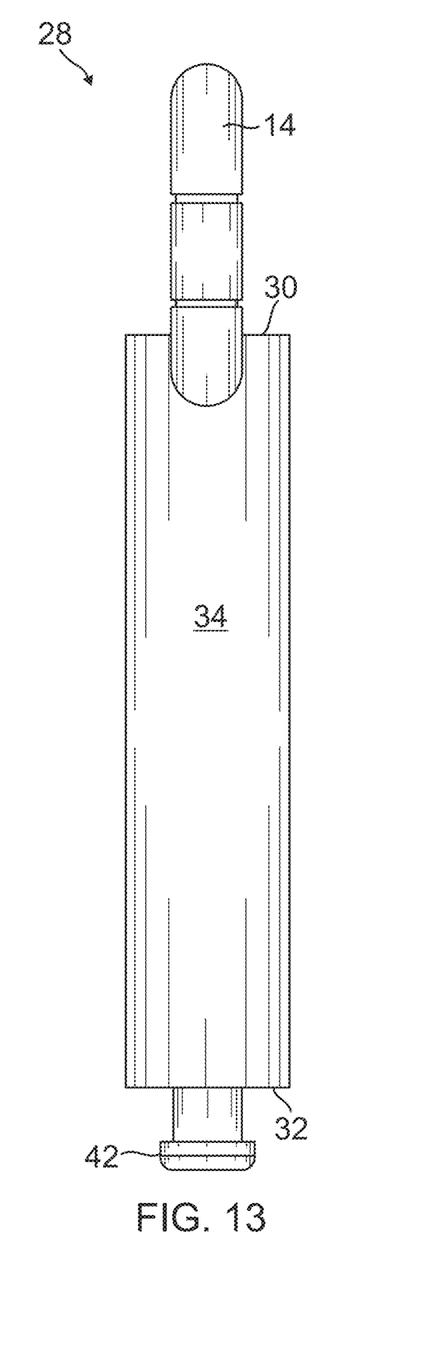
FIG. 13 is a rear view of the hook portion of the manually operated snap hook of the instant invention.

FIGS. 11-13 show the internal hook assembly 28 separated from the entire device to show the detailed parts, which include the aforementioned hook 14 that emanates out from the main body outer cylinder 12 which is attached to a main elongated portion 34 of the internal hook assembly 28, said main elongated portion 34 having a top 30 and a bottom 32 with flanges 38 extended out from the main elongated portion 34 at both the top 30 and the bottom 32 with a recessed portion 36 therebetween. The flanges 38 include apertures 40 through which the slide bolt assembly 44 is attached with the spring 20 placed under the slide bolt assembly 44 into the recessed portion 36 of the internal hook assembly 28. Below the bottom 32 of the internal hook assembly 28 is a male connector 42 that connects to the swivel ring assembly 18.

Figure 14:
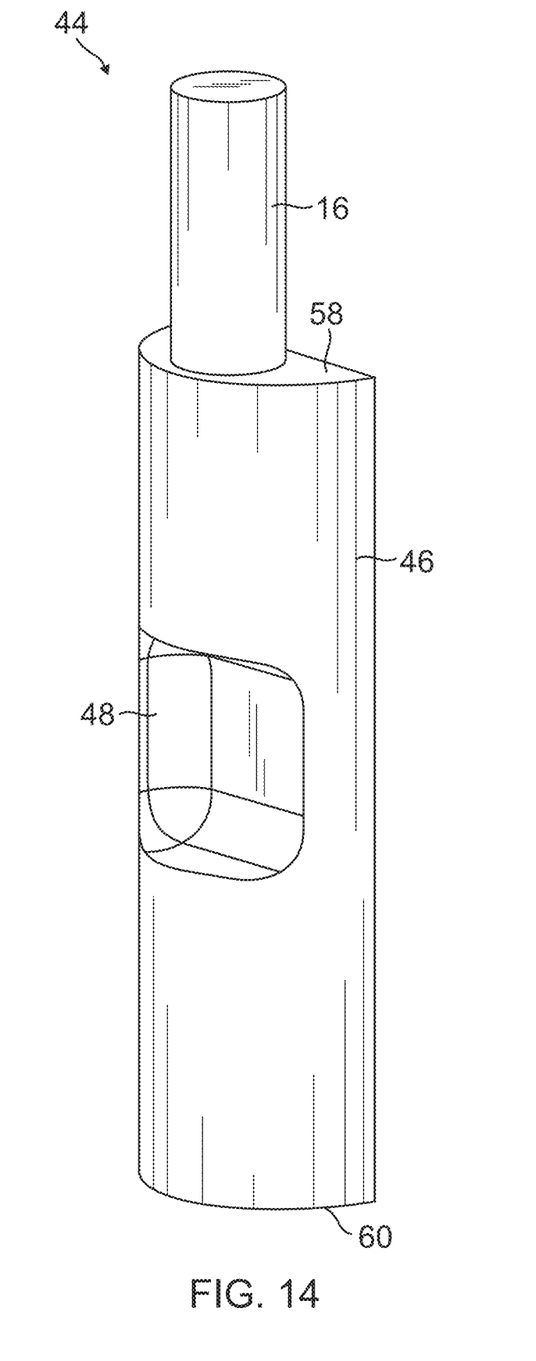
FIG. 14 is a front perspective view of the slide bolt assembly of the manually operated snap hook of the instant invention.
Figure 15:
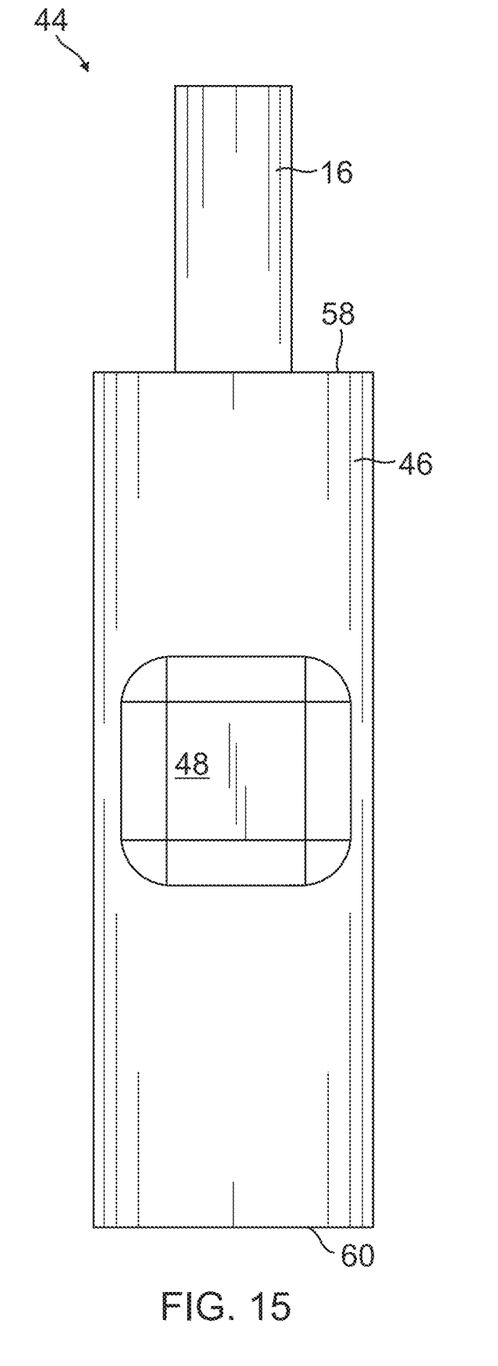
FIG. 15 is a front view of the slide bolt portion of the manually operated snap hook of the instant invention.
Figure 16:
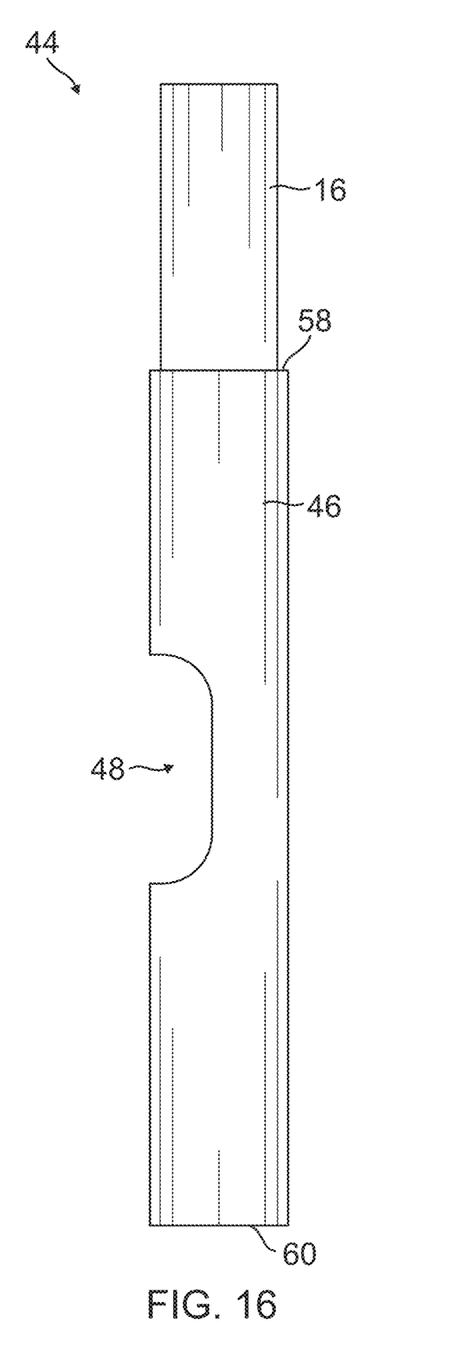
FIG. 16 is a side view of the slide bolt portion of the manually operated snap hook of the instant invention.
Figure 17:
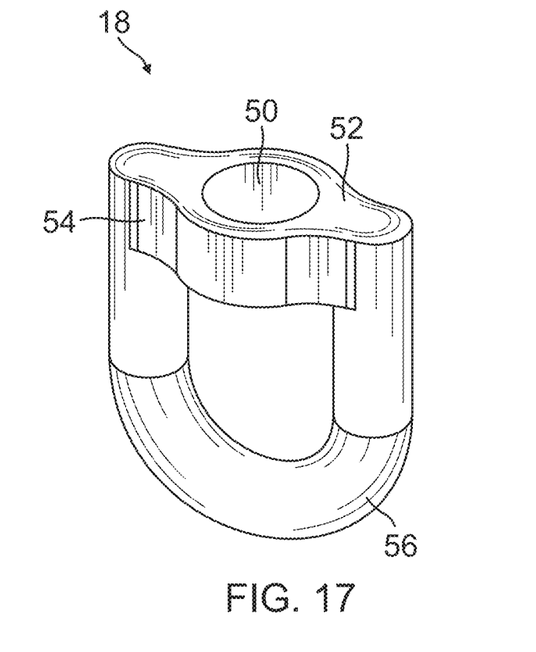
FIG. 17 is a front perspective view of the swivel ring portion of the manually operated snap hook of the instant invention.
Figure 18:
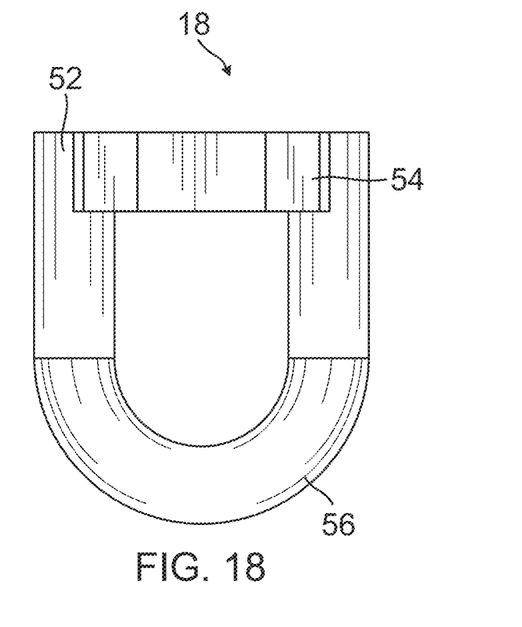
FIG. 18 is a front view of the swivel ring assembly of the manually operated snap hook of the instant invention.
Figure 19:
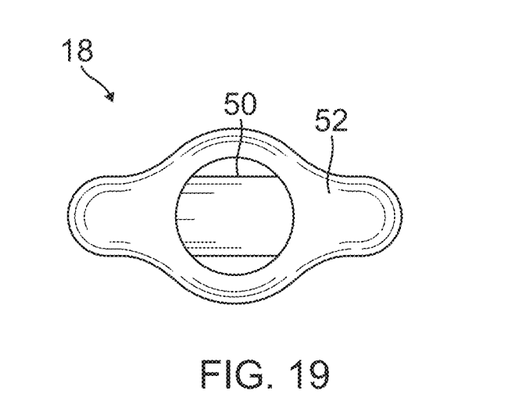
FIG. 19 is a top view of the swivel ring assembly of the manually operated snap hook of the instant invention.
Figure 20:
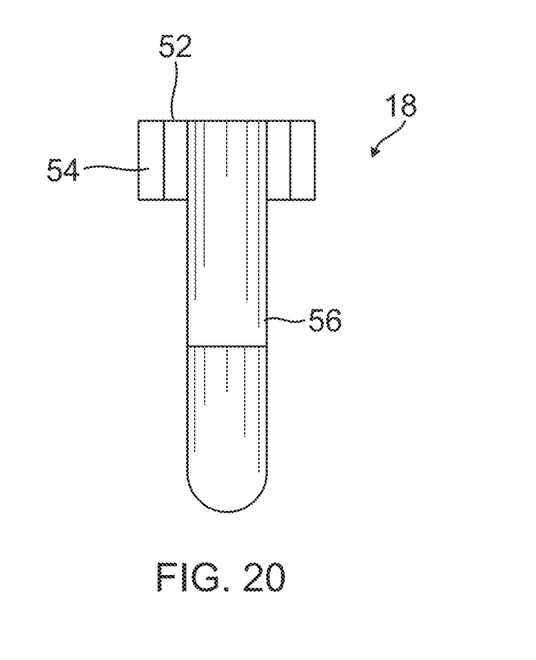
FIG. 20 is a side view of the swivel ring assembly of the manually operated snap hook of the instant invention.
Figure 21:
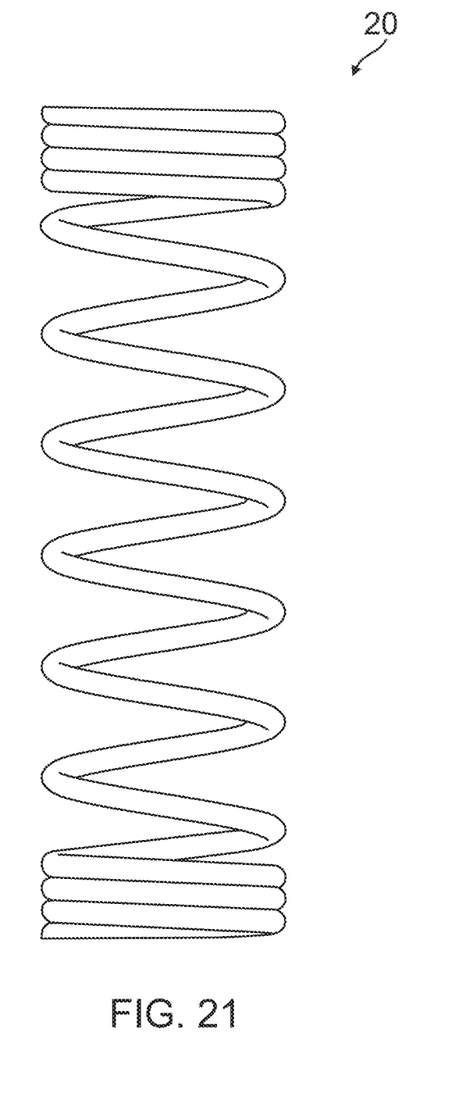
FIG. 21 is a side view of the spring assembly of the manually operated snap hook of the instant invention.
Figure 22:
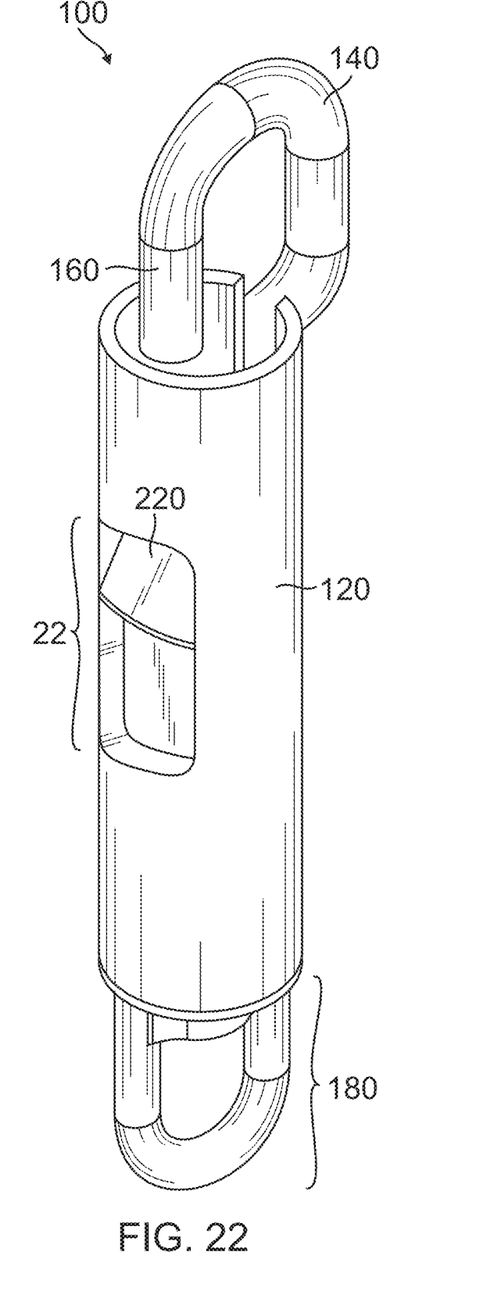
FIG. 22 is a front perspective view of an alternate embodiment of the manually operated snap hook of the instant invention that includes a protruding actuator.
Figure 23:
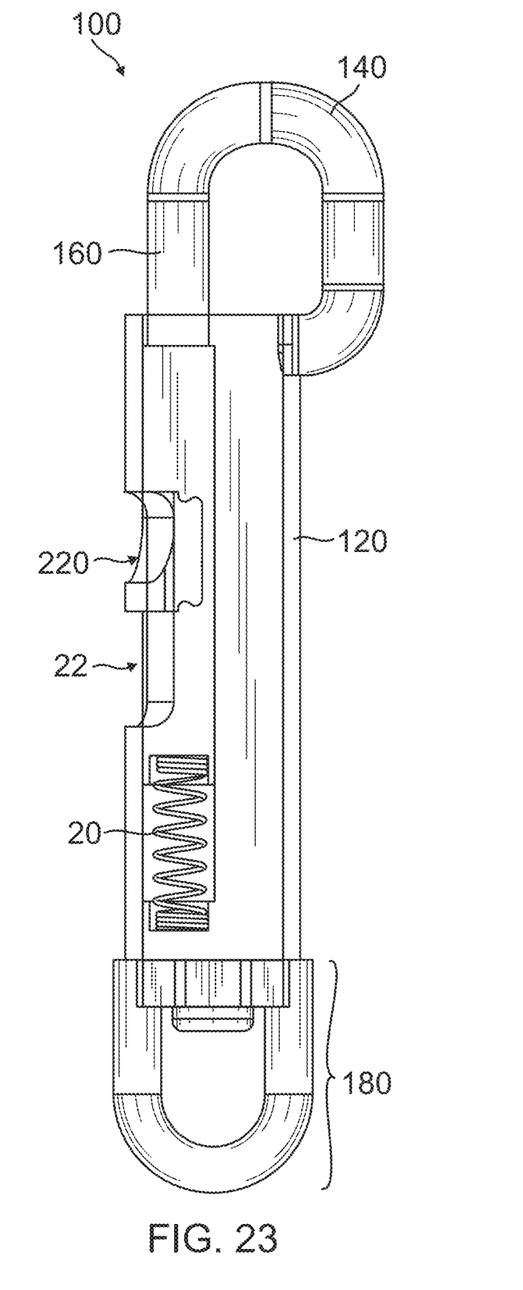
FIG. 23 is a side view of the alternate embodiment of the manually operated snap hook of the instant invention with the internal assembly shown including the protruding actuator.

The slide bolt assembly 44 is shown separated from the main device in FIGS. 14-16. The slide bolt assembly 44 has a top 58 and a bottom 60. Attached to the top 58 of the slide bolt assembly 44 is the aforementioned bolt 16 that emanates out the top open portion of the main body outer cylinder 12 for connection to and disconnection from the hook 14. The slide bolt assembly 44 has a main body elongated portion 46 and a recessed portion 48, both of which align with and correspond to the both the main body outer cylinder 14 and its recessed portion 22 and the internal hook assembly 28 and its main elongated portion 34 and recessed portion 36.

The swivel ring assembly 18 is shown in various views in FIGS. 17-20. The swivel ring assembly 18 has a main base 54 with a top 52 through which is an aperture 50 that connects to the male connector 50 found on the internal hook assembly 28. A closed loop ring 56 connects to either side of the main base 54 of the swivel ring assembly 18. When connected to the male connector 50 of the internal hook assembly 28, the snap hook can rotate therearound.

Figure 24:
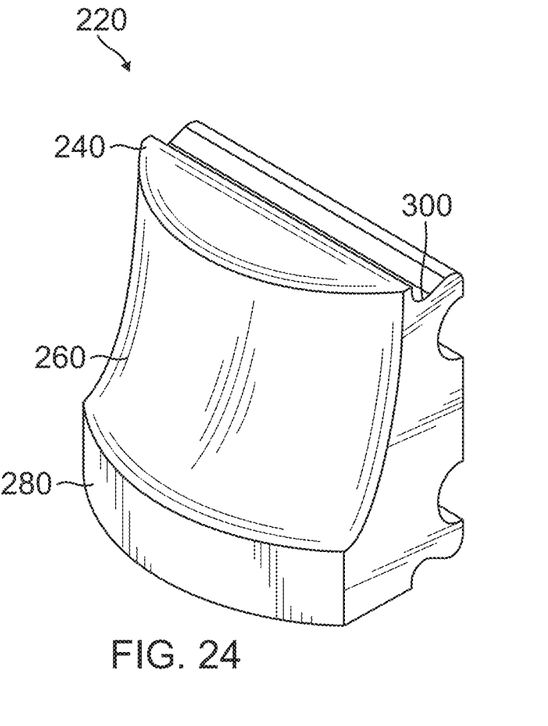
FIG. 24 is a top perspective view of the protruding actuator of the alternate embodiment of the manually operated snap hook of the instant invention.
Figure 25:
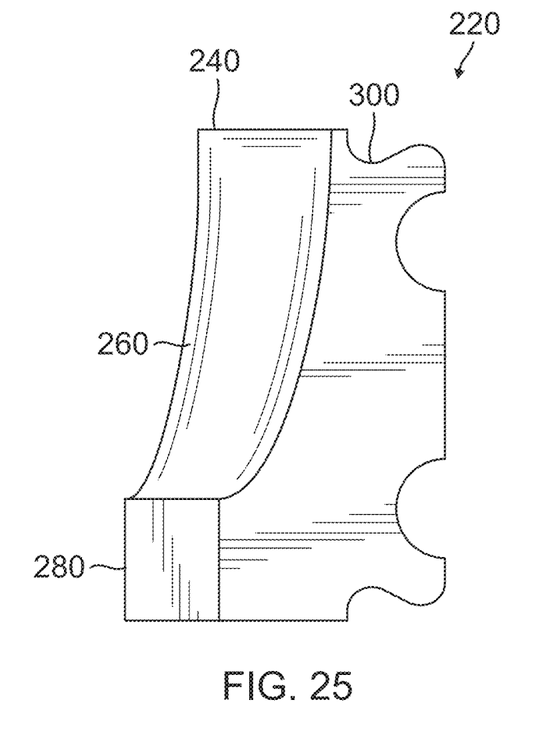
FIG. 25 is a side view of the protruding actuator of the alternate embodiment of the manually operated snap hook of the instant invention.
Figure 26:
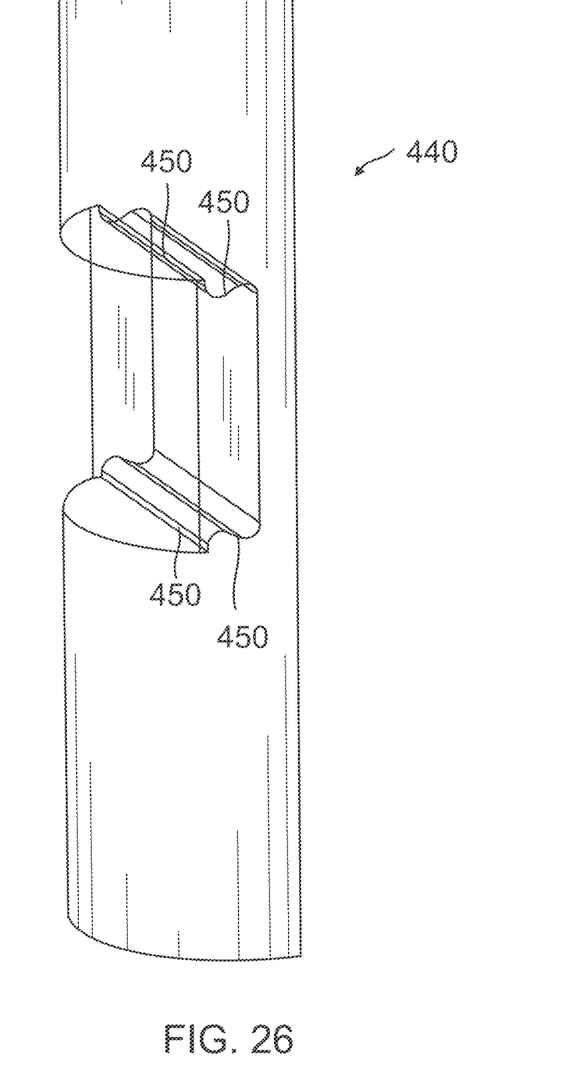
FIG. 26 is a side perspective view of an alternate slide bolt assembly designed to fit with the alternate protruding actuator of FIG. 25.

An alternate embodiment of the instant invention and its additional part are illustrated in FIGS. 22-26. In this embodiment, the snap hook 100 includes all of the same components as the preferred embodiment, including the main body outer cylinder 120, the hook 140 and associated assembly, the bolt 160 with modified slide bolt assembly 440, the swivel ring assembly, the spring and the recessed portion 22. What is added is an external actuator 220 which protrudes slightly out of the top of the recessed portion 22 of the main body outer cylinder 120 and is connected to the actuator 24 but provides a slight ledge upon which to exert pressure to move the bolt 160. FIGS. 24-25 shows the external actuator 220 in detail showing its top portion 240, its bottom portion 280 and the sloped face 260 that extends from the top portion 240 to the bottom portion 280 with the sloped face moving from one plane to another to provide a protruding ledge to depress to actuate the actuator 24. The back side of the external actuator 220 includes grooves 300 that fit into grooves 450 in the alternate embodiment of the slide bolt assembly 440 as shown in FIG. 26.

The invention illustratively disclosed herein suitably may be practiced in the absence of any element which is not specifically disclosed herein.

The discussion included in this detailed description is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A manually operated snap hook comprising:
    a main body outer cylinder, said main body outer cylinder further comprising:
        an open top;
        an open bottom;
        an outer surface;
        a recessed cutout along said outer surface; and
        a cut out proximate said open top;
    an internal hook assembly situated inside of said main body outer cylinder, said internal hook assembly further comprising:
        a main elongated portion having a top and a bottom;
        a hook attached to said top;
        a first flange extending perpendicularly outward from said top;
        a second flange extending perpendicularly outward from said bottom;
        an aperture in said first flange;
        a recessed portion along said main elongated portion between said first and second flanges; and
        an extending member extending vertically down from said bottom of said main elongated portion;
    a slide bolt assembly situated in said recessed portion along said main elongated portion of said internal hook assembly, said slide bolt assembly further comprising:
        a flat face to rest in said recessed portion along said main elongated portion of said internal hook assembly;
        a concave surface opposite said flat face, said concave surface having a recessed portion positioned to match said recessed cutout along said outer surface of said main body outer cylinder, said concave surface having and a top and bottom; and
        a bolt attached to said top of said concave surface, said bolt to extend through said aperture in said first flange in said internal hook assembly in order emanate through said top of said main body outer cylinder and to connect to and disconnect from said hook of said internal hook assembly;
    a spring situated below said bottom of said concave surface of said slide bolt assembly in said internal hook assembly; and
    an actuator situated inside of said recessed cutout of said main body outer cylinder that when depressed activates said spring to move said bolt vertically downward from said hook from a closed position to an open position.

2. The manually operated snap hook as defined in claim 1 wherein said manually operated snap hook further comprises a swivel ring assembly attachable to said extending member of said bottom of said main elongated portion of said internal hook assembly, said swivel ring assembly further comprising:
    a main base having a first end and a second end;
    an aperture in said main base to connect said extending member from said bottom of said main elongated portion of said internal hook assembly; and
    a closed loop that connects to both said first and second ends of said main base.

3. The manually operated snap hook as defined in claim 1 wherein a protruding external actuator is connected to said slide bolt assembly above said actuator, said protruding external actuator further comprising:
    a top base in a first plane;
    a bottom base in a second plane, said second plane extending out beyond said first plane;
    a sloping front face extending from said top base and said bottom base thereby creating a concave surface that is depressable to activate said actuator; and
    a rear face.

* * * * *